United States Patent [19]
Park et al.

[11] Patent Number: 5,315,877
[45] Date of Patent: May 31, 1994

[54] LOW COST VERSATILE PRESSURE TRANSDUCER

[75] Inventors: Kyong M. Park, Thousand Oaks; Abrar A. Tirmizi, Simi Valley, both of Calif.

[73] Assignee: Kavlico Corporation, Moorpark, Calif.

[21] Appl. No.: 19,595

[22] Filed: Feb. 19, 1993

[51] Int. Cl.$^5$ .............................. G01L 9/12
[52] U.S. Cl. .......................... 73/724; 73/718
[58] Field of Search .............. 73/718, 724, 756; 361/283; 29/25.41

[56] References Cited

U.S. PATENT DOCUMENTS

| | | | |
|---|---|---|---|
| 4,340,409 | 7/1982 | Brooks et al. | 73/724 |
| 4,425,799 | 1/1984 | Park | 73/718 |
| 4,617,607 | 10/1986 | Park et al. | 73/724 |
| 4,903,164 | 2/1990 | Bishop et al. | 361/283 |
| 5,025,667 | 6/1991 | Strasser | 73/718 |
| 5,043,841 | 8/1991 | Bishop et al. | 73/718 |
| 5,159,525 | 10/1992 | Tate | 361/283 |

*Primary Examiner*—Richard E. Chilcot, Jr.
*Assistant Examiner*—William L. Oen
*Attorney, Agent, or Firm*—Poms, Smith, Lande & Rose

[57] ABSTRACT

A versatile low cost capacitive type of electrical pressure transducer includes a sensor module providing an output signal indicative of fluid pressure effective thereon, and an elongate cylindrical housing receiving the module and providing for communication thereto of a first fluid pressure (which may have a high pressure level), and of a second fluid pressure (which may range from a vacuum through atmospheric pressure to a pressure level of a few hundred pounds). Consequently the transducer may operate as a gauge pressure sensor or as a differential pressure sensor. Alternatively, other types of sensor modules may also be employed in housings of the same or substantially the same design to fulfill other types of pressure measurement tasks. The commonality of component parts of the various sensors contributes to a reduces cost. Also, the components of the housing are economical to manufacture and assemble, and provide for testing and calibration of the sensors at an intermediate step of manufacture. Thus, further cost savings are realized. The housing provides for electrical shielding of the sensor module from electromagnetic and radio frequency interference, as well as filtering power surges and higher frequency noise. Accuracy and service life of the transducers are thus improved. A connector portion of the housing is secured by a tubular portion thereof by means of low cost rolling operations, and also provides a second source of support to the sensor module in resisting displacement in the housing caused by high fluid pressures. As a result an inexpensive pressure transducer is realized which is applicable to measurement of rather high fluid pressures.

18 Claims, 3 Drawing Sheets

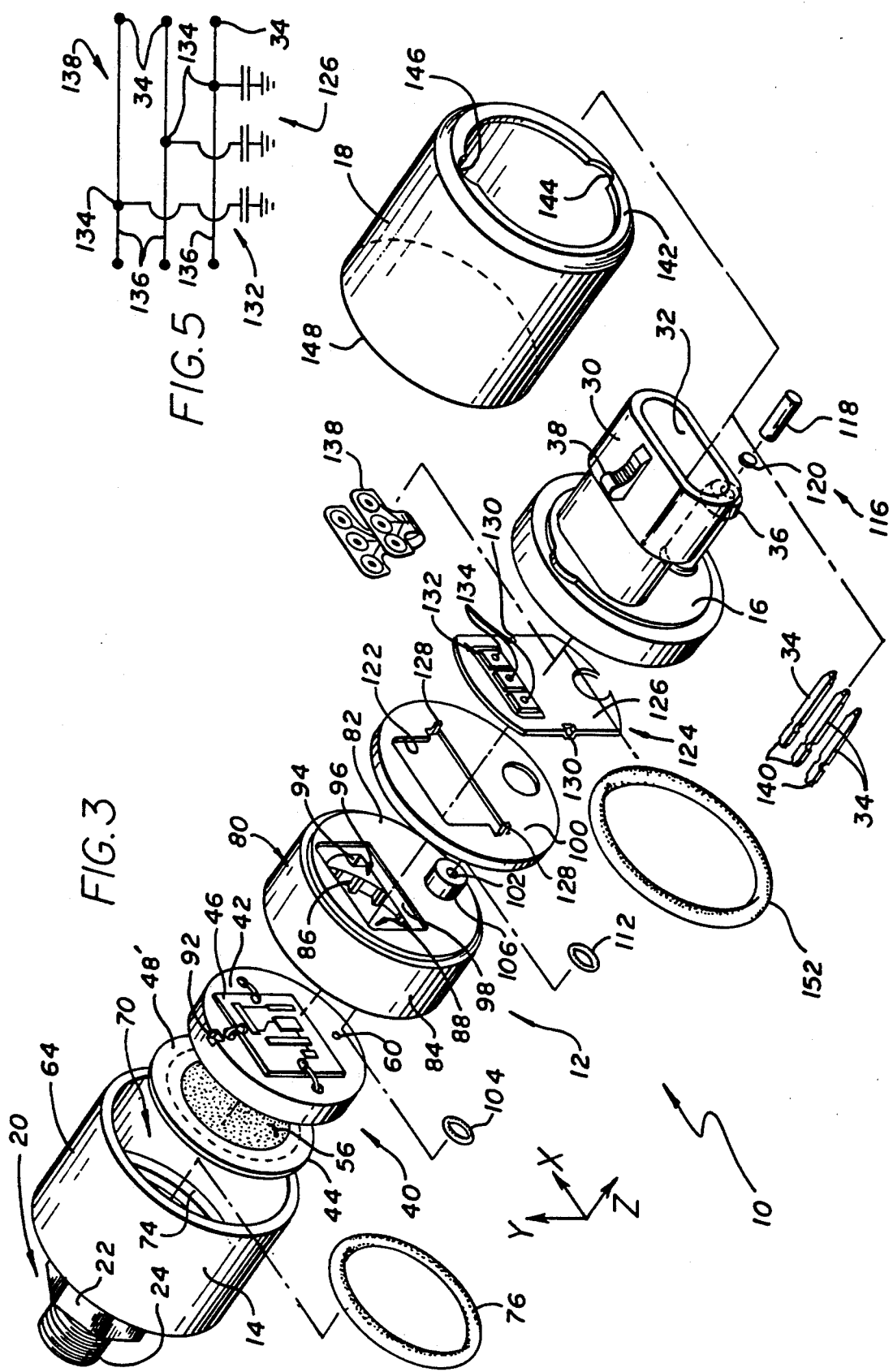

LOW COST VERSATILE PRESSURE TRANSDUCER

FIELD OF THE INVENTION

The present invention is in the field of pressure sensors and pressure transducers. More particularly, the present invention relates to a low cost versatile electronic pressure transducer with substantially a single housing design and alternative pressure sensor modules in the housing may be used as a gauge-pressure or differential-pressure transducer, or in a variety of other transducer modes, including use as an absolute-pressure, pressure-referenced, or temperature-biased sensor.

BACKGROUND OF THE INVENTION

A high-pressure capacitive pressure transducer is known in accord with U.S. Pat. No. 4,617,607, (the '607 patent) issued 14 Oct. 1986 to Kyong M. Park (who is a coinventor of the present invention) and Hung-Chih Chen, and which is assigned to the assignee of the present application. According to the teaching of the '607 patent, a high pressure transducer may include a high pressure fitting cooperating with a capacitive sensor module. The high pressure fitting includes a flexible metal diaphragm sealingly separating the high pressure fluid from the sensor module. An electrical circuit of the sensor module provides an electrical signal in response to fluid pressure force transmitted to the module via the flexible metal diaphragm. Also, the transducer includes a power supply for the electrical circuit of the module. A housing of the transducer includes at one end thereof the high pressure fitting, and a cylindrical portion of the housing encloses the sensor module and the power supply. At its end opposite the high pressure fitting, the housing includes an electrical connector providing for connection of the electrical signal externally of the transducer.

The transducer according to the '607 patent is accurate, rugged, and reliable. It is applicable over a considerable pressure range. Unfortunately, the transducer according to the '607 patent is somewhat expensive to manufacture. The housing of this sensor is somewhat complex, its parts count is high, and manufacturing assembly is undesirably time consuming. Also, while this transducer might be used either as a gauge pressure or absolute pressure sensor, it does not provide for its use as a differential pressure sensor.

Another conventional pressure transducer is known in accord with the teaching of U.S. Pat. No. 4,425,799, (the '799 patent) issued 17 Jan. 1984, to Kyong M. Park, and also assigned to the assignee of the present application. According to the '799 patent, a differential pressure transducer includes a pressure fitting sealingly cooperating with a pressure sensor module to define a first chamber. The pressure fitting defines part of a housing for the transducer, and provides for admission of a first pressurized liquid to the first chamber. The pressure sensor module includes a diaphragm on one side bounding the first chamber, and on the other side bounding a second chamber. The housing and pressure sensor module cooperatively define a passage connecting the second chamber with a port. At the port, the housing defines a liquid reservoir, and provides for communication to the reservoir to a second pressurized liquid. A low-viscosity liquid fills the second chamber, the passage, and part of the liquid reservoir. A membrane in the liquid reservoir sealingly separates the second pressurized liquid from the low viscosity liquid while providing for transmission of liquid pressure from the former to the latter. As with the pressure transducer taught by the '607 patent, the transducer taught by the '799 patent includes an electronic circuit for converting capacitance changes of the sensor module into an electrical signal. An opening in the housing of the transducer according to the '799 patent provides for extension outwardly of electrical conductors carrying this signal.

While the differential pressure transducer of the '799 patent is also accurate, rugged, reliable, and provides for measurement of differential pressures, it does not provide for its use either as a gauge or absolute pressure sensor. The pressure transducer according to the '799 patent is lower in parts count than the sensor according to the '607 patent, but is nevertheless more expensive to manufacture than is desired.

In view of the above, a need exists for a versatile low cost electronic pressure sensor which can be used either as a gauge pressure sensor, or as a differential pressure sensor, which can be used over a wide range of pressures, which by substitution of pressure sensor modules of different configurations and types allows the same or substantially the same housing design to be used also for other pressure measurement tasks, which allows parts commonality among the several sensor configurations, and which has wide-ranging applicability to a variety of pressure sensing uses in addition to the versatility of applications allowed by its use in either gauge or differential-pressure mode. Also the low cost pressure transducer should be rugged, accurate, reliable, and low in parts count to facilitate low costs of manufacture and assembly. A desirable pressure transducer of the foregoing type should also facilitate its calibration during manufacture and provide good retention of this initial calibration so that subsequent recalibrations are not needed. The sensor should also provide for shielding of the sensor module and circuitry from radio frequency interference (RFI) as well as electromagnetic interference (EMI). Desirably, such a low cost versatile pressure transducer should also filter out power supply surges or pulses so that the electronic circuitry of the transducer is protected and is not damaged by such surges or impulses.

SUMMARY OF THE INVENTION

In view of the above, the present invention provides a pressure transducer including a disk-like sensor module defining a pressure responsive face and providing an output signal indicative of a pressure level of pressurized fluid acting on the pressure responsive face. A housing encloses the sensor module and includes a cup-shaped electrically conductive high pressure fitting member. The high pressure fitting member integrally includes an end wall and a side wall cooperatively defining a cavity receiving the sensor module, and the sensor module at a peripheral edge of the pressure responsive face sealingly cooperates with the high pressure fitting member at the end wall thereof to define a high pressure first chamber in the cavity. The first chamber is bounded by the pressure responsive face and the end wall, and the fitting member defines a port opening to the chamber. The side wall includes a radially inwardly extending marginal edge lip portion defining an opening to the cavity and urging the sensor module into sealing cooperation at the peripheral edge thereof with the end wall of the fitting member.

According to a preferred exemplary embodiment of the invention the pressure sensor module is of capacitive type with a disk-like substrate portion carrying a disk-like diaphragm portion. The diaphragm portion on one side defines the pressure-responsive face of the sensor module, and on the other side bounds an internal chamber and carries a capacitive coating. The substrate portion on one side also cooperates with the diaphragm to bound the internal chamber therebetween and carries a capacitive coating confronting that of the diaphragm to define a variable capacitor. On the other side, the substrate portion carries a hybrid integrated circuit which is electrically coupled to the variable capacitor to provide an electrical output indicative of pressure acting on the sensor module. The substrate portion also defines a passage which in cooperation with passages defined by the housing communicates the chamber within the sensor module to ambient pressure or to a source of a differential pressure. The housing defines a port communicating with this passage and internal chamber of the pressure sensor module.

The housing encloses a pressure sensor module and provides for application to the module of a first fluid pressure communicating to one port of the housing. Either atmospheric pressure (if gauge pressure is to be measured) or a second fluid pressure (if differential pressure is to be measured) is communicated to a second port of the sensor. Still alternatively, the transducer may be configured for use as an absolute pressure sensor, or as a pressure-referenced (pressure offset biased) sensor, or as a temperature-biased pressure transducer, for example. Alternative configurations of the pressure sensor module of the pressure transducer allows for these measurements of absolute, pressure-referenced, or temperature-biased pressures with transducers using substantially a single housing design. The housing provides also for EMI/RFI shielding of the sensor module, and for immobilization of the sensor module within the housing to prevent variation of shunt capacitances which are compensated for during a calibration of the sensor. The housing also provides for connection to the sensor module of electrical conductors.

The pressure transducer at the one port thereof is able to handle low as well as high fluid pressures so that the transducer is applicable over a considerable pressure range. At the second port, the sensor is able to accept a comparatively lower, but still significant, fluid pressure level. Consequently, a considerable range of gauge or differential pressure measurement tasks can be accomplished with sensors using the single housing design.

DESCRIPTION OF THE DRAWING FIGURES

FIG. 1 provides a longitudinal cross sectional view of a pressure transducer embodying the present invention;

FIG. 3 depicts an exploded perspective view of the transducer;

Figure 4:
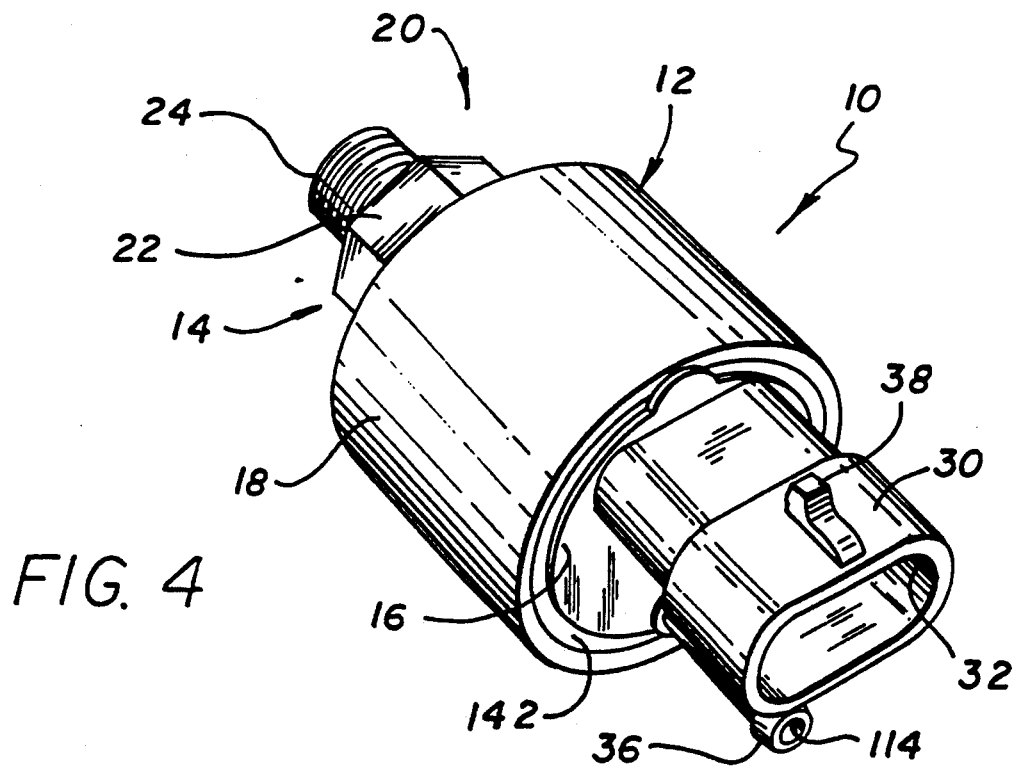

FIG. 4 provides a perspective view of the transducer generally from the same perspective as that of FIG. 3; and FIG. 5 schematically depicts an electronic circuit portion of the sensor shown in the preceding drawing Figures.

DESCRIPTION OF THE PREFERRED EMBODIMENT OF THE INVENTION

Viewing the drawing Figures in conjunction, a pressure transducer or sensor 10 includes a somewhat elongate cylindrical housing 12. In overview, the housing 12 includes a somewhat cup-shaped metallic high pressure fitting member 14, a molded polymer connector member 16, and a sleeve-like metallic tubular member 18 which secures the fitting member 14 and connector member 16 together. At one end of the housing 12, the fitting member 14 defines an axially extending boss 20 with an hexagonal wrenching portion 22, and a thread-defining nipple portion 24. An O-ring type sealing member 26 is carried upon the nipple portion 24 for sealing cooperation with a body (not shown) into which the sensor 10 is threaded at the nipple portion 24. This nipple portion defines a passage 28 (best seen in FIG. 1) extending into the sensor for communicating pressurized fluid from the body to which the sensor is mounted. Thus, the sensor 10 may be connected to a source of pressurized fluid the pressure of which is to be measured. Preferably, for reasons further explained below, the fitting member 14 is made of an electrically conductive and high-strength material, such as steel.

At the opposite end of the sensor 10, the connector member 16 defines both a connector boss 30 with a cavity 32 in which projects three connector pins 34 for receiving electrical power and providing a signal indicative of a measured pressure level, and a low pressure hose fitting 36. As depicted according to the preferred embodiment, the connector boss 30 is configured to interconnect with a standard type of automotive connector (not shown). Thus, the boss 30 defines a locking lug 38 to which the standard automotive connector will lock. However, those ordinarily skilled in the pertinent arts will recognize that the connector member 16 may include or carry a variety of different connectors. Thus, the pressure sensor 10 is not limited to automotive uses, but may find application also to industrial and aerospace uses, for example.

Figure 1:
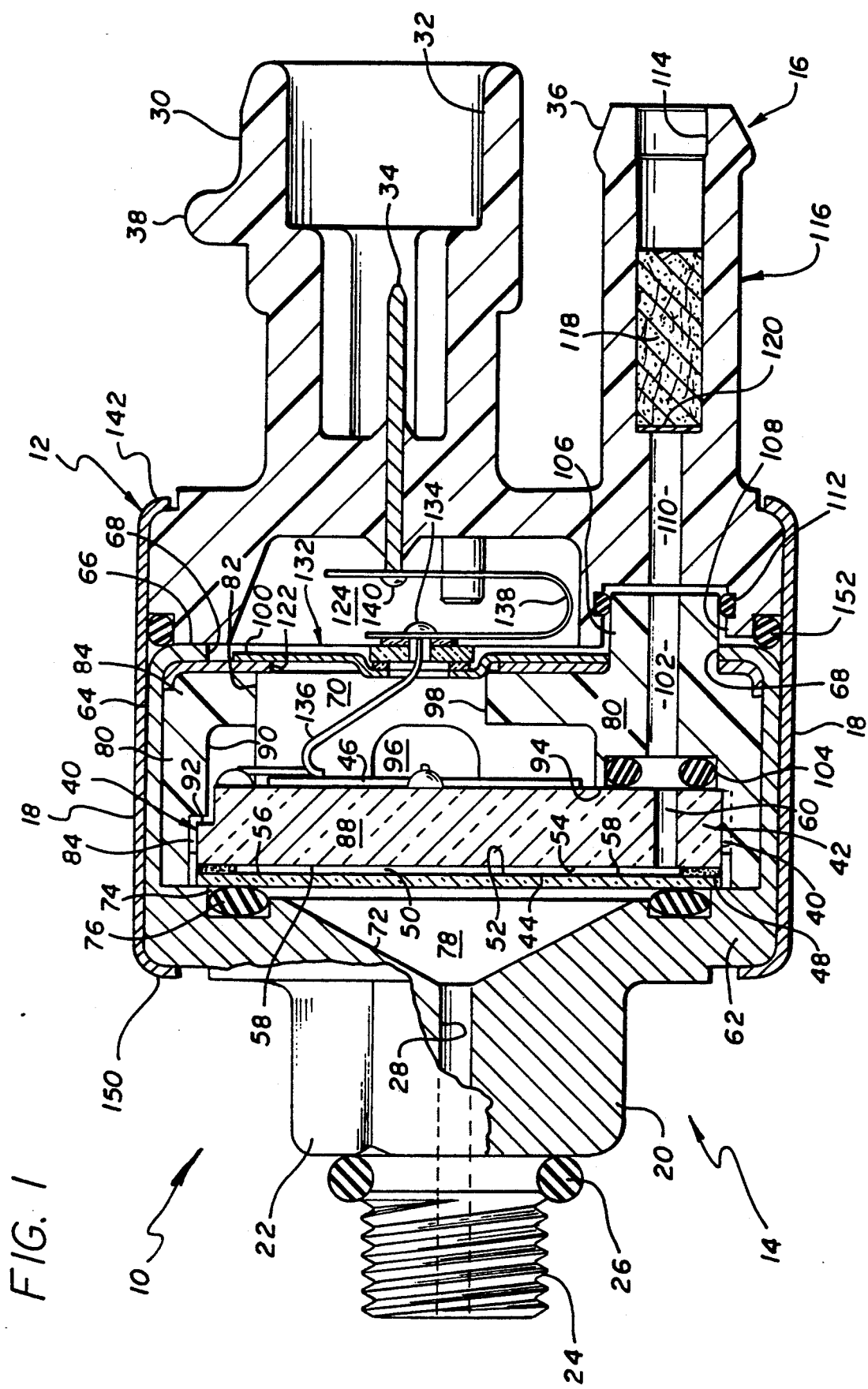
Figure 2:
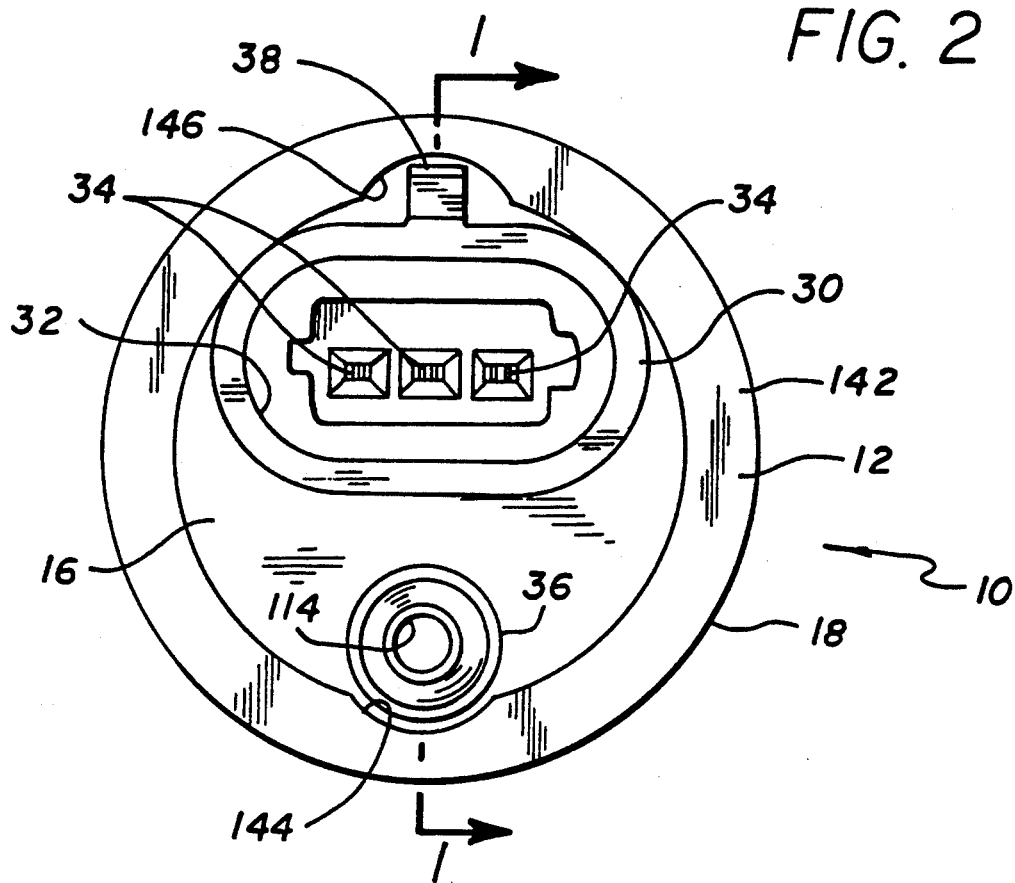
FIG. 2 is an end view taken from the right-hand end of the transducer as seen in FIG. 1.

With attention now more particularly to FIGS. 1 and 3, the sensor 10 is seen to include a conventional pressure sensor module 40 of disk-like or short cylindrical shape. According to the preferred embodiment of the invention, the sensor module 40 is a capacitive type, and includes a disk-like ceramic substrate member 42 which on one side carries a flexible, shape-retaining pressure-responsive diaphragm member 44. By way of example, the diaphragm member 44 may also be formed of ceramic material. On the side thereof opposite the diaphragm member 44, the substrate member 42 carries a hybrid integrated circuit 46, the purpose of which is further explained below. The substrate member 42 and diaphragm member 44 are sealingly secured together and spaced a small distance apart by a glass frit 48, best seen in FIG. 1. In FIG. 3, the area of sealing engagement of the frit 48 with diaphragm member 44 is indicated with the numeral 48'.

Because of the frit 48, the diaphragm member 44 and substrate member 42 cooperatively define a very thin disk-like chamber 50, viewing FIG. 1. A surface 52 of diaphragm member 44 (visible in either FIGS. 1 or 3) and a surface 54 (best seen in FIG. 1) of the substrate member 42 each carry thin conductive capacitance coatings 56 and 58 respectively. Each of the surfaces 52 and 54 bound the chamber 50 so that the coatings 56 and 58 are in this chamber. Because these coatings are very thin, only the coating 56 is easily visible in the drawing Figures, and is best seen in FIG. 3. However, the coatings 56 and 58 cooperatively define a variable capacitor which varies in value according to the spacing of diaphragm member 42 from the substrate member 44. Because the diaphragm member 44 is somewhat flexible, it is movable relative to the substrate member 42 in response to pressure forces acting on this diaphragm member.

While the substrate member 42 of the depicted preferred and exemplary embodiment defines a passage 60 communicating with the chamber 50 for a purpose to be explained further hereinbelow, those ordinarily skilled in the pertinent arts will recognize that the chamber 50 may be closed and substantially evacuated, or may receive a gas, or a mixture of gasses at a reference pressure level. In the case of a sensor module with a substantially evacuated chamber 50, the sensor would measure absolute pressure. Those sensor modules with a reference gas pressure in the chamber 50 provide an absolute pressure measurement with a pressure offset bias (temperature effects being controlled or predictable in view to the known mixture of gasses used in the chamber 50), while those sensor modules with a vacuum in the chamber 50 would provide an absolute pressure measurement. Importantly, the housing 12 may receive a variety of such different sensor modules. That is, the depicted sensor module 40 is exemplary, and not exhaustive of the types of modules which may be disposed in the housing 12.

Returning to consideration of the drawing Figures the hybrid integrated circuit 46, is connected to the variable capacitor defined cooperatively by the coating 56 and 58 by conductive traces or vias on or through the substrate 42. This hybrid integrated circuit provides an output signal indicative of effective pressure acting on the diaphragm 44. As will be explained, this output signal from the circuit 46 is communicated externally of the sensor 10 via connector boss 30 and connector pins 34.

However, as pointed out above, the sensor 10 may also receive a variety of sensor modules. This variation in sensor modules may extend to the provision of a sensor module 40 which is of a resistive type, or of strain gauge type, or of piezoelectric type, for example. That is, the invention is not limited to use of capacitance sensor modules 40 in housing 12. The sensor modules may be of a variety of other types. In such cases, while the housing 12 may remain substantially the same, the configuration of the sensor module 40 may be internally different while retaining the generally disk-shaped configuration needed for sealing interface with the housing. Moreover, while the exemplary embodiment of the invention is depicted and described with reference to a sensor module of capacitive type, it should be kept always in mind that a variety of different sensor module types may also be disposed in the housing 12 during manufacture of the sensor 10.

With the above in mind, attention now particularly to FIGS. 1 and 3 will show that the fitting member 14 integrally includes an end wall portion 62, and an axially extending side wall portion 64 having a radially inwardly extending lip part 66 which defines an opening 68. The end wall 62 and side wall 64 cooperate to define a cavity 70 receiving the sensor module 40. In FIG. 1, the lip part 66 is seen in its operative position, while in FIG. 3, this lip part is seen as it would appear during manufacture of the sensor 10 preparatory to receipt of the sensor module 40 into the cavity 70. The end wall 62 defines a conical recess 72 opening toward the cavity 70, and to which the passage 28 of nipple portion 24 communicates. An axially disposed annular groove 74 circumscribes the recess, and receives an O-ring type sealing member 76. The diaphragm member 44 of the sensor module 40 at a peripheral portion thereof sealingly engages the sealing member 76 to cooperatively define a chamber 78.

In order to precisely and immovably position the sensor module 40 in the cavity 70, the latter also snugly receives a cup-shaped spacer member 80 which is preferably molded of slightly yieldable but shape-retaining polymer material. The spacer member 80, like the fitting member 14, also includes an end wall and a side wall, referenced with the numerals 82 and 84, respectively. However, the spacer member 80 opens in the opposite direction to the fitting member 14 and is nested into the cavity 70 thereof to cooperatively capture the sensor module 40 therein. That is, the end walls 62 and 82 cooperatively capture the sensor module 40 therebetween. More particularly, the side wall 82 of the spacer member 80 defines plural radially inwardly extending ribs 86 which cooperatively define a cavity 88 of an open diameter slightly smaller than the outer diameter of sensor module 40. The sensor module 40 is lightly press fitted into the cavity 88 of the spacer member with an axially extending key portion 90 of the latter received into a small notch 92 of the former. Thus, the sensor module 40 is nonrotational with respect to the spacer member 80. With the sensor module pressed into the spacer 80, the latter is snug in the cavity 70 of the fitting 14. Thus, the sensor module 40 is virtually immovable relative to the fitting member 14 both rotationally and in an X-Y plane (referring to the coordinate axis reference indicated on FIG. 3).

To complete immobilization of the sensor module, the spacer member 80 includes shoulder portions 94 bearing against the face of substrate member 42 opposite to the diaphragm member 44. The spacer member 80 defines a chamber 96 providing clearance for the hybrid circuit 46, and a window 98 in the end wall 82 opening to the chamber 96. Disposed against the end wall 82 is an electrically conductive cover member 100. The cover member 100 is received into cavity 70 into engagement with the end wall 82, and the lip part 66 is rolled from its position seen in FIG. 3 to the position of FIG. 1 to permanently capture the spacer member 80, sensor module 40, and cover member 100 in cavity 70, as well as to urge the sensor module 40 into sealing relation with the O-ring 76 at the periphery of the diaphragm member 44. This rolling operation also substantially immobilizes the sensor module 40 relative to the fitting member 14 in the axial or 'Z' direction. Also, electrical connection of the conductive cover member 100 to the conductive fitting member 14 is assured.

The spacer member 80 defines a stepped axially extending through bore 102, which adjacent the sensor module 40 receives an O-ring sealing member 104. The sealing member 104 engages the sensor module around the passage 60 thereof to sealingly communicate this passage with the bore 102. At its opposite side, the spacer member 80 defines an axially extending boss 106. This boss 106 is received into a larger diameter portion 108 of a stepped bore 110 defined by the connector member 16. The bore 110 opens outwardly in the hose fitting 36, and another O-ring type sealing member 112 is received into the bore portion 108 to sealingly cooperate with the boss 106 in sealingly connecting the spacer member 80 with the connector member 16. Thus, the low pressure fitting 36 of the connector member 16 is communicated with the chamber 50 within sensor module 40, but is sealingly isolated from the remainder of the sensor 10. In an outer larger diameter portion 114 of bore 110 a filter and moisture-excluding assembly 116 is disposed. The assembly 116 preferably includes a cylindrical plug 118 of sintered metal, and a membrane 120 of Teflon paper. The exemplary embodiment of the invention includes a plug 118 of sintered 316-L stainless steel. Filter plug is pressed into the bore portion 114. In use of the pressure sensor 10, the filter plug 118 is effective to exclude particulates from the chamber 50, while the membrane 120 excludes liquid moisture therefrom.

Viewing FIGS. 1 and 3, it is seen that the cover member 100 defines a window 122 congruent with the window 98, and providing access into the chamber 96. During manufacture of the sensor 10, after the rolling operation which captures the sensor module 40 in cavity 70, the partially completed sensor 10 is calibrated. In this calibration process, a reference pressure is applied to the chamber 78 via passage 28, and the output signal from the hybrid circuit 46 is brought to a desired level by trimming one or more printed resistors (not shown on the drawing Figures) which are disposed on the surface of the circuit 46 and are accessible through the windows 98 and 122.

In order to complete shielding of the hybrid circuit 46 and sensor module 40 from RFI and EMI, the cover member 100 carries a feed through plate assembly, generally referenced with the numeral 124. The feed through assembly 124 includes a conductive plate portion 126, which closes the windows 98/122, and which is physically secured and electrically connected to the cover member 100 by a pair of tabs 128 projecting from the latter and received into notches 130 of the plate portion 126. A capacitive feed through 132 is carried by the plate portion 126, and includes three separate conductive terminals 134. Three separate conductors 136 connect from the hybrid circuit 46 on one side of the feed through assembly 124 to each of the terminals 134, and a ribbon conductor 138 respectively defines three separate conductive traces extending from the terminals 134 on the other side of the feed through assembly 124 to the respective pins 34. However, as is schematically depicted in FIG. 5, the capacitive feed through 132 also defines a respective branch capacitance between each terminal 134 and the plate portion 126. Consequently, high frequency (RFI) interferences and power spikes are shorted by this branch capacitance to the plate portion 126, which is grounded to the fitting 14 via cover member 100, and thus, is grounded to the body carrying the sensor 10.

During manufacture of the sensor 10, the flexibility and length of ribbon conductor 138 provides for soldering of one end thereof to the terminals 134 and of the other end thereof to the pins 34 at an end portion 140 thereof which protrudes from the connector member 16 inwardly of the sensor 10. Thereafter, the high pressure fitting 14 with its internal components, including the pressure sensor module 40, and the electrically connected connector member 16, are placed into the sleeve-like tubular member 18. As seen in FIG. 3, this tubular member 18 at the referenced stage of manufacture includes a radially inwardly extending lip 142 which is notched at 144 and 146 to clear the low pressure hose fitting 36 and locking lug 38, respectively. At its opposite end, as seen in FIG. 3, the tubular member 18 is open at 148 to receive the fitting 14 and connector 16. After the fitting and connector members are received into the tubular member 18, the opposite end (at 148) thereof is rolled to define a second radially inwardly extending lip 150.

In cooperation, the lips 142, 150, capture the fitting 14 and connector member 16 in the tubular member 18, as well as serving to reinforce the lip 66. That is, the sensor 10 includes a duality of features holding the sensor module 40 into sealing engagement with the O-ring 76. In the first instance, the rolling operation which creates lip 66 urges the sensor module into engagement with the O-ring 76. Subsequently, after the hybrid circuit 46 is trimmed to calibrate the sensor, and the feed through assembly 124 is in place to complete the RFI/EMI shielding of the sensor module 40 and circuit 46, the ribbon cable 138 and connector 18 are connected. Finally, the mentioned components are inserted into the tubular member 18 and the rolling operation is performed to form the lip 144, permanently capturing the sensor module 40 in the housing 12. This last rolling operation also serves to back up the lip 66 with the forceful axial engagement of the connector member 16. Attention to FIG. 1 also will show that the connector member 16 carries an O-ring type sealing member 152 which is urged axially into sealing engagement with the lip 66 to further protect the interior of the sensor 10 from environmental contaminants.

Having observed the structure of the sensor 10, attention may now be given to its use and advantages in such use. Because the high pressure fitting 14 is made of a strong material such as steel, and the sensor module 40 is well supported by the lip 66 and spacer member 80 in engagement with the seal 76, the sensor 10 can accept considerable pressure at the port provided by passage 28. For example, the sensor 10 may accept as much as three thousand pounds of pressure, or more, at passage 28. On the other hand, the molded polymer connector 18 defining hose fitting 36 may accept a pressure in the range of from a vacuum through atmospheric pressure and up to a few hundred pounds, of more. Thus, the sensor 10 in its uses both as a gauge or differential pressure sensor is able to accept a high pressure up to about three thousand pounds, and a low pressure in the range from vacuum through atmospheric to as much as several hundred pounds. More particularly, by leaving the hose fitting 36 open to atmospheric pressure, the sensor 10 may also be used as a gauge pressure sensor with a range up to three thousand pounds, or more.

The sensitivity of the sensor 10 may be varied by providing sensor modules with diaphragm members 44 of varying stiffness. By way of example only, this may be accomplished by varying the thickness or material of the diaphragm member 44. On the other hand, the sensor 10 may be configured with an elevated range of high sensitivity by providing a reference pressure in the chamber 50. This type of sensor module has been referred to herein as a pressure offset biased sensor. Also, the sensor modules 40 may be provided with a temperature bias feature as explained above. In each case, the housing 12 may remain the same, or substantially the same. That is, in some uses of the sensor, and dependent upon the particular sensor module configuration therein, it may be desirable to omit or close the hose fitting 36 on the connector member 16, or to omit the O-ring 112 so that the filter assembly and passage 110 serve as atmospheric pressure vent for the interior of housing 12. However, this omission of the fitting 36 or O-ring 112 is not a significant alteration of the design of housing 12. Moreover, these alterations can be effected at low cost. Thus, the versatility at low cost and parts commonality of the variety of sensors possible with the invention contributes to a significant overall cost reduction.

Further to the above, because the high pressure fitting is conductive material, as is the cover member 100 carrying the feed through assembly 124, EMI and RFI shielding of the sensor 10 is excellent. The sensor 10 also well retains its calibration and does not suffer from spurious signals or calibration drift from movements of the sensor module 40 within the housing 12. That is, the spacer member 80 well captures and immobilizes the sensor module 40 within the housing 12.

While the above-described preferred embodiment of the inventive pressure transducer or sensor may be used as a gauge pressure sensor with the passage 60 communicating ambient pressure into chamber 50 via the low pressure hose fitting 36, or alternatively, may be used as a differential pressure sensor by connection of a comparatively low pressure source to this fitting, it also may be used as an absolute, reference-pressure biased, or temperature-biased sensor, for example, as explained above. When the sensor 10 is used as a gauge or differential pressure sensor, the filter and moisture-excluding assembly 116, resists entry of particulates and liquid moisture into the chamber 50. Additionally, this filter assembly may inhibit movement of some water and other liquids in vapor form into the chamber 50 by promoting their condensation in the plug member 118 externally of the liquid resistive membrane 120.

All of the described uses for the sensor 10 are possible with the simple expedient of providing different sensor modules 40 in the sensor housings 12 during manufacture. In some of these uses when ambient or differential pressure in not to be provided to the sensor module, the low pressure fitting 36 is conveniently plugged to exclude environmental contaminants from the interior of housing 12. Also, as pointed out above, a variety of different sensor modules other than a capacitive type may be used in the housing 12. However, in each of these instances, the sensor 10 provides a low cost, rugged, easily manufactured, and well shielded pressure sensor. Because the housing 12 can be used for a variety of different pressure sensors, that is, for an absolute pressure, or gauge pressure, or differential pressure, or pressure-biased, or temperature-biased sensor which is appropriate for low as well as high pressure ranges, the costs of providing differing housing structures for each of these various sensors is eliminated by the present invention.

While the present invention has been depicted, described, and is defined by reference to particularly preferred embodiments of the invention, such reference does not imply a limitation on the invention, and no such limitation is to be inferred. The invention is capable of considerable modification, alteration, and equivalents in form and function, as will occur to those ordinarily skilled in the pertinent arts. The depicted and described preferred embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A versatile low-cost gauge or differential pressure transducer usable at high pressures, said pressure transducer comprising:

a cup-shaped electrically conductive and high strength high-pressure fitting member having an integral end wall and side wall cooperatively defining a cavity, said side wall defining an axial opening to said cavity, and said end wall outwardly defining an axial boss portion with a nipple for connection of said transducer to a first source of pressurized fluid, inwardly said end wall defining a conical recess circumscribed by a sealing feature for sealing cooperation with a pressure sensor module receivable into said cavity, and a passage communicating said nipple with said conical recess;

a pressure sensor module including a disk-like substrate portion on one side thereof sealingly carrying a disk-like diaphragm portion cooperating with said substrate portion to define an internal chamber, said diaphragm portion outwardly defining an axial pressure-responsive face for said pressure sensor module, said diaphragm portion and said substrate portion each carrying respective conductive coatings in said internal chamber which coatings cooperatively define a variable capacitor varying in capacitance in response to pressurized fluid effective upon said diaphragm portion, said substrate portion on the other side thereof carrying a hybrid integrated circuit electrically responsive to changes in said variable capacitor to provide an output signal indicative of a pressure level of said pressurized fluid effective on said diaphragm portion, said pressure sensor module being received into said cavity and at said pressure-responsive face thereof sealingly cooperating with said sealing feature of said end wall to bound a high-pressure chamber in said recess;

a cup-shaped spacer member received into said cavity and defining a respective cavity axially receiving said pressure sensor module with said pressure-responsive face disposed away from a respective end wall of said spacer member, said cup-shaped spacer member being disposed oppositely to said cup-shaped fitting member to capture said sensor module between the respective end walls of each and to urge said module sealingly into engagement with said sealing feature;

said side wall of said high-pressure fitting member defining a radially inwardly extending lip portion defining said opening to said cavity and forcefully cooperating with said spacer member to urge both the latter toward said end wall and said pressure sensor module into sealing engagement with said sealing feature;

electrically conductive plate means at said opening to said high-pressure fitting member for on the one hand closing said opening and on the other hand for connecting said output signal therethrough externally of said cavity;

an electrical connector member axially juxtaposed with said high-pressure fitting member at said opening thereof and including an axial surface engaging said lip portion, said connector member including electrical connectors for connecting said output signal externally of said transducer;

each of said substrate portion, said spacer member, and said connector member defining respective passages communicating with one another and with said internal chamber of said pressure sensor module, said connector member also defining a port communicating with said passages and opening thereon in a respective nipple for communication of said transducer alternatively with ambient pressure or with a second source of pressurized fluid, a filter assembly disposed in one of said passages for excluding particulates and liquid moisture; and a tubular member receiving both said high-pressure fitting member and said connector member in axial juxtaposition, said tubular member at each end thereof including a radially inwardly extending lip part engaging a respective one of said connector member and said high-pressure fitting member to forcefully urge these members toward one another;

whereby said high-pressure fitting member and said tubular member cooperatively provide a duality of axial support urging said pressure sensor module into sealing engagement with said sealing feature in opposition to fluid pressures communicating to said high-pressure chamber.

2. A pressure transducer comprising:

a disk-like sensor module defining a pressure responsive face, and providing an output signal indicative of a pressure level of pressurized fluid acting on said pressure responsive face;

a housing enclosing said sensor module and including a cup-shaped electrically conductive high pressure fitting member, said high pressure fitting member integrally including an end wall and a side wall cooperatively defining a cavity receiving said sensor module, said sensor module at a peripheral edge of said pressure responsive face sealingly cooperating with said high pressure fitting member at said end wall thereof to define a high pressure first chamber in said cavity, said first chamber being bounded by said pressure responsive face and said end wall, and said fitting member defining a port opening to said first chamber;

said side wall including a radially inwardly extending marginal edge lip portion defining an opening to said cavity and urging said sensor module into sealing cooperation at said peripheral edge thereof with said end wall of said fitting member;

further including a connector member axially aligning with and juxtaposed with said high pressure fitting member, said connector member including plural electrical connection pins, and means for connecting said sensor module with said connection pins to connect said output signal eternally of said transducer;

said housing further including a tubular member receiving therein both said high pressure fitting member and said connector member in adjacent axial alignment; and wherein said tubular member defines a pair of radially inwardly extending lips at respective opposite ends thereof, each of said pair of lips of said tubular member engaging a respective one of said high pressure fitting member and said connector member to urge these member axially together.

3. The pressure transducer of claim 2 further including a spacer member received in said cavity and extending between said marginal edge lip portion and said sensor module to urge the latter toward said end wall.

4. The pressure transducer of claim 3 further including a conductive cover and feed through member spanning and closing said cavity at said opening thereof, said cover and feed through member engaging both said radially inwardly extending marginal edge lip portion and said spacer member to urge the latter toward said sensor module.

5. The pressure transducer of claim 4 wherein said cover and feed through member includes a capacitive feed through assembly, said capacitive feed through assembly electrically conducting said output signal externally of said cavity and providing a branch capacitive connection to said high pressure fitting member.

6. The pressure transducer of claim 3 wherein said spacer member is cup-shaped and defines a respective cavity receiving said sensor module, said spacer member also defining plural axially and radially inwardly extending ribs cooperatively engaging said sensor module to retain the latter substantially immovably in said cavity of said fitting member.

7. The pressure transducer of claim 6 wherein said spacer member also defines a respective end wall, said spacer member and said fitting member being disposed to open in the opposite directions, and said end walls of each cooperatively capturing said sensor module therebetween.

8. The pressure transducer of claim 7 wherein said sensor module a notch, and said spacer member further includes a key portion engaging into said notch of said sensor module to prevent rotational relative movement therebetween.

9. The pressure transducer of claim 2 wherein said connector member supportingly engages said marginal edge lip of said high pressure fitting member to further urge said sensor module into sealing engagement with said fitting member at said end wall thereof.

10. The pressure transducer of claim 2 wherein said sensor module includes a respective chamber expanding and contracting in response to movement of said pressure responsive face as pressurized fluid acts on the said pressure responsive face said connector member defining a second port, and said connector member and said spacer member cooperatively defining a passage communicating said port to said respective chamber of said sensor module.

11. The pressure transducer of claim 10 wherein said sensor module includes a disk-like substrate member carrying a disk-like diaphragm member, said substrate member and said diaphragm member cooperatively defining said respective chamber of said sensor module, said substrate member defining a passage opening thereon and communicating with said respective chamber, said spacer member sealingly cooperating with said substrate member at said passage thereof to communicate said second port to said respective chamber of said sensor module.

12. The pressure transducer of claim 11 wherein said connector member defines a hose fitting, said second port opening on said hose fitting.

13. The pressure transducer of claim 12 further including filter means disposed between said second port and said respective chamber of said sensor module for excluding particulates and moisture therefrom.

14. The pressure transducer of claim 13 wherein said filter means includes a plug-like body of sintered metal disposed in said hose fitting, and a membrane of moisture impermeable material adjacent to said plug-like body.

15. The pressure transducer of claim 14 wherein said membrane is teflon paper.

16. A pressure sensor comprising:
 a cup-shaped fitting member integrally including an end wall and a side wall cooperatively defining a cavity therein and an opening to said cavity, a chamber in said cavity, and a port communicating said chamber with a source of pressurized fluid;
 a sensor module disposed in said cavity and sealingly cooperating with said end wall to bound said chamber in said cavity, said sensor module including a disk-like substrate carrying a disk-like diaphragm member and sealingly cooperating therewith to bound a disk-like second chamber, and said sensor module providing an output signal indicative of a fluid pressure level effective on said diaphragm member;
 a spacer member disposed in said cavity in engagement with said substrate member of said sensor module to urge the latter into sealing engagement with said end wall;
 said side wall including a marginal edge lip portion extending radially inwardly to define said opening to said cavity and cooperating with said spacer member to urge the latter into engagement with said sensor module;
 a connector member axially aligning with said cavity and supportingly engaging said lip portion of said side wall, said connector member including electrical connectors for communicating said output signal externally of said pressure sensor, and conductor means conducting said output signal from said sensor module to said connectors; and
 a tubular member receiving both said fitting member and said connector therein in axial juxtaposition, said tubular member including at opposite ends thereof respective radially inwardly extending lip portions sandwiching said connector member and said fitting member therebetween and urging them toward one another.

17. A pressure sensor according to claim 16 further including a cover and electrical feed through assembly received in said fitting member cavity and interposing between said spacer member and said lip portion, said cover and feed through assembly including a disk-like plate portion spanning and closing said cavity opening, and a capacitive feed through on the one hand electrically connecting said output signal to said connector member and on the other hand providing a branch capacitive connection to said fitting member.

18. A pressure transducer including a disk-like fluid pressure responsive sensor module having an axially disposed pressure responsive face and providing an output electrical signal in response to fluid pressure effective thereon, and a chambered housing receiving said sensor module and communicating fluid pressure thereto, said housing including a cup-shaped high pressure fitting including an integral end wall and a side wall cooperatively defining a cavity and an axial opening thereto, said sensor module being received axially into said cavity and sealingly cooperating at said pressure responsive face with said end wall to bound a chamber for receiving said pressurized fluid, said housing defining a pressure inlet port for communicating said pressurized fluid into said chamber, said side wall at said opening defining a radially inwardly extending lip cooperating with said sensor module to urge the latter into sealing engagement with said end wall, a connector member axially disposed at said cavity opening both for connecting said output signal externally of said transducer and for engaging said lip portion, and a tubular member receiving both said fitting member and said connector member and at each end thereof including a respective radially inwardly extending lip engaging a respective one of said fitting member and said connector member both to secure these members together and to provide a duality of axial support urging said sensor module into sealing engagement with said end wall by forcefully engaging of said connector member with said lip portion of said fitting member.

* * * * *